(No Model.)
S. M. COLE.
MEASURING PUMP.
No. 296,531. Patented Apr. 8, 1884.
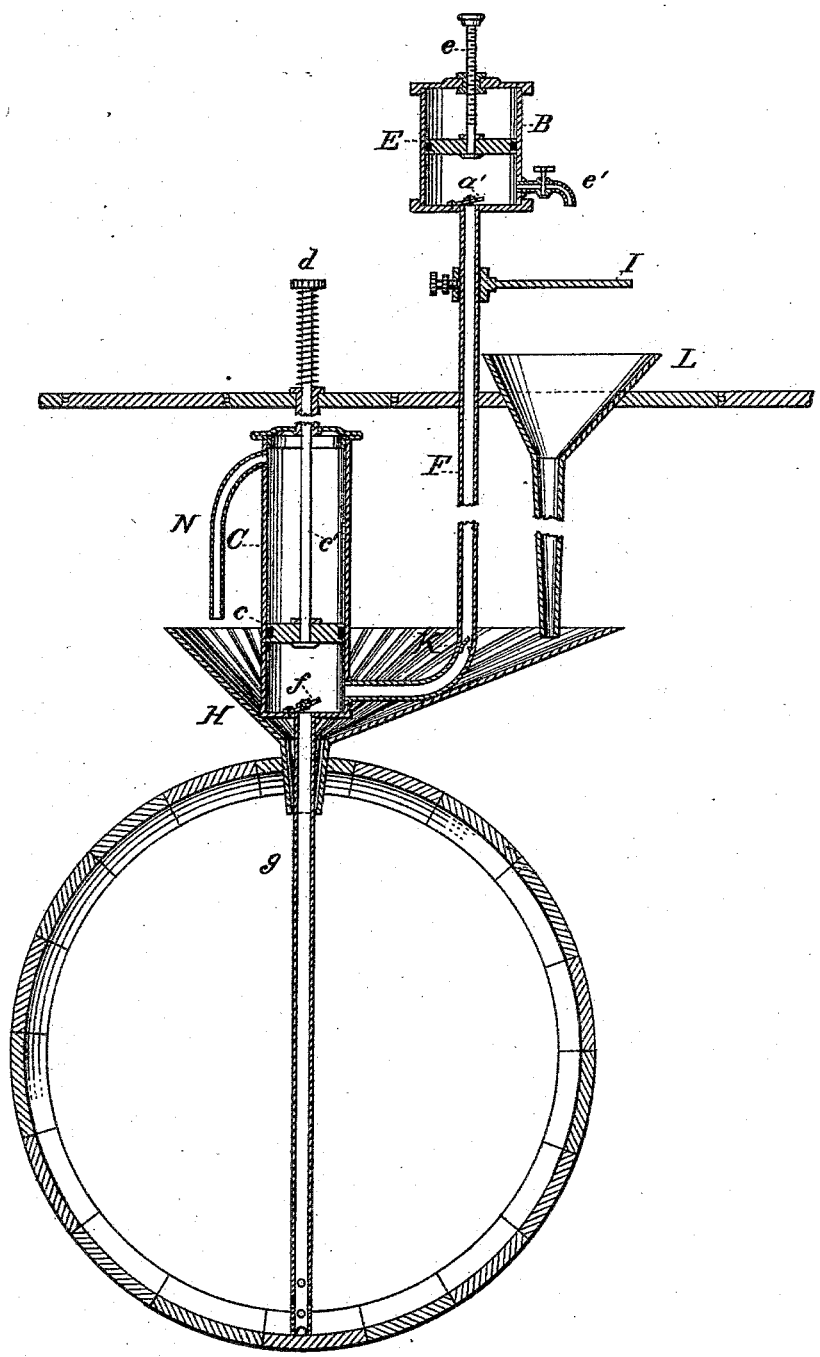
WITNESSES
Villette Anderson.
Theo. Mungen.
INVENTOR
Sherman M. Cole,
by Andison Smith
his ATTORNEYS.
N. PETERS. Photo-Lithographer, Washington, D. C.

UNITED STATES PATENT OFFICE.

SHERMAN M. COLE, OF ANAMOSA, IOWA.

MEASURING-PUMP.

SPECIFICATION forming part of Letters Patent No. 296,531, dated April 8, 1884.

Application filed September 22, 1883. (No model.)

*To all whom it may concern:*

Be it known that I, SHERMAN M. COLE, a citizen of the United States, residing at Anamosa, in the county of Jones and State of Iowa, have invented certain new and useful Improvements in Measuring-Pumps; and I do declare the following to be a full, clear, and exact description of the invention, such as will enable others skilled in the art to which it appertains to make and use the same, reference being had to the accompanying drawing, and to letters or figures of reference marked thereon, which forms a part of this specification.

The figure of the drawing is a representation of a vertical transverse section of my invention, showing the same applied to a barrel.

This invention has relation to measuring-pumps for elevating and measuring oils or other fluids through the bung-holes of the barrels or other vessels in which they are shipped, to be dispensed to the consumer or other person; and it consists in the construction and novel arrangement of devices, as will be hereinafter fully described, and particularly pointed out in the claims appended.

The measuring device or receptacle herein employed is the same as that shown in Letters Patent No. 270,021, of January 2, 1883, and is made of glass or metal. If made of glass, it has a graduated scale on the outside, to indicate the amount of oil or fluid drawn off or remaining within it. If made of metal, the graduated scale is on the stem $e$, as shown in the drawing. It is situated above the barrel, and may be either in the first or second stories of the building, as may be required, and is connected to the cylinder C by the pipe or tube F, having a check-valve, K, near its lower bent end.

E is a piston or float on the lower end of the stem $e$, and fits snugly on the inside of the measure. The stem $e$ extends up through a vent in the top of the measure, and is provided with a graduated scale, to indicate the quantity of oil or fluid drawn off. The stem $e$ and float E move freely up and down in the measurer B. Near the bottom, at the side of B, is a cock, $e'$, for the purpose of drawing off the oil or fluid from B.

$d'$ is a valve in the bottom of B at its connection with the pipe F. This valve opens upward or inward.

The cylinder C has the usual piston, $c$, piston-rod $c'$, connected to the handle $d$, pipe F, connected to its lower side, and the valve $f$, opening upward in its bottom. The pump stock or tube $g$ is rigidly secured to the bottom of the cylinder, and extends down through a corrugated funnel, H, resting in the bung-hole of the barrel, and rests on the bottom of the barrel, where it is notched or perforated to admit the oil or fluid to the pump-tube. The funnel H permits the air to enter the barrel as the oil or fluid is being pumped out.

An adjustable grate rest or bracket, I, is secured to the pipe F, beneath the cock or faucet $e'$, for receiving and holding the measures or vessels into which the oil or fluid is to be drawn. It is made adjustable, in order that vessels of different heights may be placed under the faucet. The funnel H is extended at one side to catch the drip from the rest or faucet, or from the overflow of a vessel on the rest, and return it to the barrel. When the measure is above the floor or in the second story, a funnel, L, with a long stem, is employed to convey the drip to the funnel H.

The cylinder C has an escape or overflow pipe, N, to return any oil or liquid that may rise above the piston back through the funnel H to the barrel.

In order to change the pump from an empty barrel to a full one, the whole pump may be raised out of the barrel by sliding the pump-rod up through the floor high enough to remove the empty barrel and put a full one in its place. The pump-cylinder being greater in diameter than those ordinarily used on bung-hole pumps, a much greater quantity of oil or fluid can be raised in a given time by it than by them. The drip at the faucet or receiving-vessel and the overflow at the cylinder are returned to the barrel, so that there is no unnecessary waste.

Having thus fully described my invention, what I claim as new, and desire to secure by Letters Patent, is—

1. In a device for elevating and measuring oils or other fluids through the bung-hole of a barrel, the pump-cylinder having the pump-tube rigidly secured to its bottom, and extending to and resting on the bottom of the barrel, in combination with a registering measuring-receptacle having a gaged float, valve, and faucet, a valved pipe connecting the measuring-receptacle with the pump-cylinder, the piston, piston-rod, and pump-lever, and a funnel-seat through which the pump-tube passes into the barrel, substantially as specified.

2. In a measuring-pump, the combination with the measuring-receptacle, the pump and valve-tube connecting, and the drip-funnel seated in the bung-hole of the barrel, of the adjustable grate-rest secured to the valve-pipe beneath the measuring-receptacle and above the drip-funnel, substantially as specified.

3. In an elevating and measuring pump, the corrugated drip H and air-inlet funnel seated in the bung-hole of a barrel beneath the discharge-faucet of the measuring-receptacle B, and the intermediate adjustable grate-rest, I, for the receiving-vessel, all combined and adapted to operate substantially as specified.

In testimony whereof I affix my signature in presence of two witnesses.

SHERMAN M. COLE.

Witnesses:
  THEO. MUNGEN,
  JOSEPH DORSEY.